(12) United States Patent
Cheich et al.

(10) Patent No.: US 11,351,750 B2
(45) Date of Patent: Jun. 7, 2022

(54) EXPANDABLE SLIT-SHEET STOCK MATERIAL, DUNNAGE CONVERSION SYSTEM AND METHOD FOR EXPANDING

(71) Applicant: Ranpak Corp., Concord Township, OH (US)

(72) Inventors: Robert C. Cheich, Independence, OH (US); Dennis J. Wagner, Painesville, OH (US)

(73) Assignee: Ranpak Corp., Concord Township, OH (US)

( * ) Notice: Subject to any disclaimer, the term of this patent is extended or adjusted under 35 U.S.C. 154(b) by 345 days.

(21) Appl. No.: 16/604,048

(22) PCT Filed: Mar. 28, 2018

(86) PCT No.: PCT/US2018/024704
§ 371 (c)(1),
(2) Date: Oct. 9, 2019

(87) PCT Pub. No.: WO2018/191012
PCT Pub. Date: Oct. 18, 2018

(65) Prior Publication Data
US 2021/0101356 A1    Apr. 8, 2021

Related U.S. Application Data

(60) Provisional application No. 62/483,688, filed on Apr. 10, 2017.

(51) Int. Cl.
*B31D 1/00* (2017.01)
*B31D 3/02* (2006.01)
(Continued)

(52) U.S. Cl.
CPC ......... *B31D 5/0065* (2013.01); *B31D 1/0031* (2013.01); *B32B 3/266* (2013.01);
(Continued)

(58) Field of Classification Search
None
See application file for complete search history.

(56) References Cited

U.S. PATENT DOCUMENTS

| 1,999,282 A | * | 4/1935 | Clemens | B65D 65/44 |
| | | | | 428/211.1 |
| 5,365,819 A | * | 11/1994 | Maida | B21D 31/04 |
| | | | | 83/695 |

(Continued)

FOREIGN PATENT DOCUMENTS

| CA | 2251477 A1 | * | 10/1997 |
| CN | 201990066 U | * | 9/2011 |

(Continued)

OTHER PUBLICATIONS

Machine Translation of EP-666170-A1, Aug. 1995 (Year: 1995).*
(Continued)

*Primary Examiner* — Jeffrey A Vonch
(74) *Attorney, Agent, or Firm* — Renner, Otto, Boisselle & Sklar, LLP

(57) ABSTRACT

An improved expandable slit-sheet stock material is configured to aid in temporarily restricting opening of a plurality of slits of the slit-sheet stock material, such as during winding of the unexpanded stock material or during expansion of the stock material. Each slit of the plurality of slits includes one or more un-slit reinforcement portions, such as reinforcement ties, extending fully between opposite longitudinal sides of the slit, and disposed between opposed transverse endpoints of the slit. The reinforcement ties minimize or prevent tearing of the stock material during the winding or expansion. A dunnage conversion system for expanding the slit-sheet stock material includes an expander having a pair of opposed rollers. The rollers engage the stock
(Continued)

material to effect breaking of the un-slit reinforcement portions and expansion of the slit-sheet stock material.

20 Claims, 8 Drawing Sheets

(51) Int. Cl.
| | |
|---|---|
| *B31D 3/04* | (2006.01) |
| *B31D 5/00* | (2017.01) |
| *B32B 3/24* | (2006.01) |
| *B32B 3/26* | (2006.01) |
| *B65B 55/20* | (2006.01) |
| *B65D 65/22* | (2006.01) |
| *B65D 81/03* | (2006.01) |
| *B65D 85/672* | (2006.01) |
| *B65D 81/05* | (2006.01) |
| *B65D 81/02* | (2006.01) |
| *B32B 29/00* | (2006.01) |
| *B65B 11/00* | (2006.01) |
| *B32B 3/12* | (2006.01) |

(52) U.S. Cl.
CPC .......... *B31D 3/0207* (2013.01); *B31D 3/0292* (2013.01); *B31D 3/04* (2013.01); *B31D 5/0069* (2013.01); *B31D 2205/0017* (2013.01); *B31D 2205/0023* (2013.01); *B31D 2205/0035* (2013.01); *B31D 2205/0052* (2013.01); *B32B 3/12* (2013.01); *B32B 29/00* (2013.01); *B32B 2553/02* (2013.01); *B65B 55/20* (2013.01); *B65B 2011/002* (2013.01); *B65D 65/22* (2013.01); *B65D 65/44* (2013.01); *B65D 81/03* (2013.01); *B65D 81/05* (2013.01); *B65D 85/672* (2013.01); *Y10S 428/906* (2013.01); *Y10T 428/15* (2015.01); *Y10T 428/24306* (2015.01); *Y10T 428/24314* (2015.01)

(56) References Cited

U.S. PATENT DOCUMENTS

| | | | |
|---|---|---|---|
| 5,538,778 A | 7/1996 | Hurwitz | |
| 5,667,135 A * | 9/1997 | Schaefer | A47G 23/0216 220/738 |
| 5,667,871 A | 9/1997 | Goodrich | |
| 5,688,578 A | 11/1997 | Goodrich | |
| 5,782,735 A | 7/1998 | Goodrich | |
| 6,696,127 B1 | 2/2004 | Mitchell, Jr. | |
| 6,989,075 B1* | 1/2006 | Kao | A61K 8/0208 162/123 |
| 9,376,280 B2 | 6/2016 | Page | |
| 9,701,091 B2 | 7/2017 | Page | |
| 2004/0076798 A1* | 4/2004 | Larsson | B31F 1/20 428/153 |
| 2005/0136215 A1* | 6/2005 | Kuchar | D04B 7/02 428/136 |
| 2010/0075094 A1* | 3/2010 | Cattacin | B65H 45/18 83/37 |
| 2012/0205037 A1* | 8/2012 | Kitzer | A61F 13/15723 83/13 |
| 2012/0237711 A1* | 9/2012 | Cattacin | B65H 33/18 493/369 |
| 2012/0248177 A1* | 10/2012 | Beaulieu | B65D 81/03 229/80.5 |
| 2012/0266568 A1* | 10/2012 | Prud'homme | B32B 37/12 428/116 |
| 2014/0329049 A1* | 11/2014 | Zhang | B65D 81/3865 428/135 |
| 2015/0140265 A1 | 5/2015 | Page | |
| 2015/0151895 A1* | 6/2015 | Zhang | A47G 23/0216 220/739 |
| 2015/0176303 A1* | 6/2015 | Kuchar | B65D 65/38 428/136 |
| 2016/0067938 A1 | 3/2016 | Goodrich | |
| 2016/0130104 A1 | 5/2016 | Page | |
| 2017/0313017 A1* | 11/2017 | Cheich | B31D 5/0065 |
| 2017/0341845 A1* | 11/2017 | Mulvey | B65D 23/0892 |
| 2018/0079161 A1* | 3/2018 | Cheich | B31D 5/0065 |
| 2018/0229910 A1* | 8/2018 | Kohn | B65D 33/18 |
| 2019/0100369 A1* | 4/2019 | Hoffman | B65D 81/03 |
| 2021/0101356 A1* | 4/2021 | Cheich | B31D 1/0031 |

FOREIGN PATENT DOCUMENTS

| | | | | |
|---|---|---|---|---|
| CN | 202244644 U | * | 5/2012 | |
| CN | 102733266 A | * | 10/2012 | |
| DE | 4340531 A1 | * | 6/1994 | .......... B31D 3/0238 |
| DE | 19911628 A1 | | 9/2000 | |
| EP | 666170 A1 | * | 8/1995 | ............ B32B 29/08 |
| EP | 686089 A1 | * | 12/1995 | .............. B31C 5/00 |
| EP | 0978372 A2 | | 1/2007 | |
| GB | 1534342 A | * | 12/1978 | .............. B31C 5/00 |
| JP | 49017672 U | * | 2/1974 | ............ B32B 29/08 |
| JP | 50065388 A | * | 6/1975 | .............. B31C 5/00 |
| JP | 50098194 U | * | 8/1975 | .......... B31D 3/0238 |
| JP | 01226574 A | * | 9/1989 | ............ B32B 29/08 |
| JP | 04050647 U | * | 4/1992 | |
| JP | 06320647 A | * | 11/1994 | .............. B31C 5/00 |
| JP | 07242268 A | * | 9/1995 | |
| JP | 08119334 A | * | 5/1996 | |
| JP | H092527 A | | 1/1997 | |
| JP | 09328170 A | * | 12/1997 | |
| JP | 10297676 A | * | 11/1998 | |
| JP | 2005178834 A | * | 7/2005 | |
| JP | 2006290356 A | * | 10/2006 | .............. B32B 3/12 |
| WO | WO-9318911 A1 | * | 9/1993 | .............. B31C 5/00 |
| WO | 199507225 A2 | | 3/1995 | |
| WO | WO-9601731 A1 | * | 1/1996 | .......... B31D 1/0031 |
| WO | WO-9624540 A1 | * | 8/1996 | ............ B21D 31/04 |
| WO | WO-0126889 A1 | * | 4/2001 | .............. B32B 3/12 |
| WO | WO-2015035335 A1 | * | 3/2015 | .......... B31D 3/0223 |
| WO | 2015103251 A1 | | 7/2015 | |
| WO | 2016077728 A1 | | 5/2016 | |
| WO | 2016137740 A1 | | 9/2016 | |
| WO | 2017039792 A1 | | 3/2017 | |
| WO | 2017074535 A1 | | 5/2017 | |

OTHER PUBLICATIONS

International Preliminary Report on Patentability dated Oct. 24, 2019 related to PCT/US2018/024704.
International Search Report and Written Opinion dated Jun. 14, 2018 for PCT/US2018/024704.

\* cited by examiner

EXPANDABLE SLIT-SHEET STOCK MATERIAL, DUNNAGE CONVERSION SYSTEM AND METHOD FOR EXPANDING

RELATED APPLICATIONS

This application is a national phase of International Application No. PCT/US2018/023799, filed Mar. 22, 2018 and published in the English language, and which claims priority to U.S. Application No. 62/475,488 filed Mar. 24, 2017, both of which are hereby incorporated herein by reference in their entireties.

FIELD OF THE INVENTION

This invention relates generally to a sheet stock material, a dunnage conversion system, and a method for converting the sheet stock material into a dunnage product, and more particularly to an expandable slit-sheet stock material, a dunnage conversion system, and a method for converting the slit-sheet stock material into an expanded dunnage product.

BACKGROUND

In the process of shipping one or more articles from one location to another, a packer typically places some type of dunnage material in a shipping container, such as a cardboard box, along with the article or articles to be shipped. The dunnage material typically is used to wrap the articles or to partially or completely fill the empty space or void volume around the articles in the container. By filling the void volume, the dunnage prevents or minimizes movement of the articles that might lead to damage during the shipment process. The dunnage also can perform blocking, bracing, or cushioning functions. Some commonly used dunnage materials are plastic foam peanuts, plastic bubble pack, air bags, and converted paper dunnage material.

Expandable slit-sheet packing material, also referred to as slit-sheet material, slit-sheet stock material, stock material, or sheet material, is useful as a cushioning material for wrapping articles and as a void-fill material for packages. The term expanding, as used herein, refers to a three-dimensional expansion, or a volume expansion. The material expands in length and thickness while decreasing in width, to yield an increase in volume and comparable decrease in density. The slit-sheet material has multiple slits typically arranged in rows across the sheet material. When the slit-sheet material is stretched in a direction transverse the direction of the slits, the material deforms, increasing in length and thickness. This stretching and increase in thickness of the slit-sheet material packing material is referred to as expansion.

Exemplary slit-sheet packing materials, and the manufacturing thereof, are described in greater detail in U.S. Pat. Nos. 5,667,871 and 5,688,578, the disclosures of which are incorporated herein by reference in their entireties. As described therein, one exemplary slit-sheet packing material for converting into a dunnage product is made from paper. Paper packing material is an environmentally-friendly packing material that is recyclable, biodegradable, and composed of a renewable resource.

SUMMARY OF THE INVENTION

While existing slit-sheet stock material may be used to provide an adequate resultant expanded dunnage product, the existing stock material may not have an ideal production process, be ideal for all uses, or be ideal for use with all dunnage conversion systems for expanding slit-sheet stock material. In designing slit-sheet material for conversion, a balance must be struck between tension needed to open the slits for expansion and sufficient strength of the sheet material under tension to avoid tearing of the slit-sheet material, such as during winding of the unexpanded slit-sheet material or during expansion of the slit-sheet material.

An improved slit-sheet stock material is provided that is configured to aid in controlling, such as restricting, opening of a plurality of slits of the slit-sheet stock material, to thereby minimize or prevent tearing. For example, the improved slit-sheet stock material may be configured to minimize or altogether prevent opening of the plurality of slits during winding of the unexpanded slit-sheet material into roll form for subsequent expansion in a conversion machine as the slit sheet material is unwound from the roll. The improved slit-sheet stock material may alternatively or additionally be configured to slow opening of the plurality of slits or minimize opening of slits until the respective slits are further downstream in a respective dunnage conversion system for expanding the slit-sheet material.

The downstream direction of the system, also referred to as the longitudinal direction, is the direction in which stock material travels through the system from a supply of stock material to an outlet of the system. The upstream direction is oppositely disposed to the downstream direction of the stock material.

The aforementioned expandable slit-sheet stock material is generally a pre-slit-sheet stock material, having a plurality of transversely-extending rows of slits arranged across a surface of the sheet stock material. Since tension generally is applied parallel to a length dimension of the sheet material during both winding and expansion, the slits are oriented transverse the length dimension, which is along the downstream and longitudinal directions. The rows are longitudinally-spaced from one another. Each row includes a plurality of slits intermittently dispersed across the row. And the slits in each row typically are arranged in a staggered or offset relationship relative to the slits in adjacent rows.

Each slit of the plurality of slits includes one or more un-slit reinforcement portions, such as reinforcement ties, extending between opposite longitudinal sides of the slit, and disposed between opposed transverse endpoints of the slit. These un-slit reinforcement portions are smaller in the transverse direction than the distance of un-slit spacing portions extending between adjacent slits of a row, but provide sufficient strength to hold the slit temporarily while being drawn.

An exemplary expandable slit-sheet stock material may be supported on a supply support, and the exemplary expandable slit-sheet stock according to the invention includes a plurality of expandable slits arranged in a plurality of transversely-extending, longitudinally-spaced rows of slits, where each slit is longitudinally expandable, where each slit has therein an un-slit reinforcement tie extending from an upstream side to a downstream side, longitudinally-spaced from the upstream side, of the respective slit, and where the un-slit reinforcement tie temporarily restricts opening of the plurality of slits.

Each un-slit reinforcement tie may separate a respective slit into opposed transversely-spaced apart slit portions.

Each slit may have therein one or more additional un-slit reinforcement ties fully extending between an upstream side and downstream side, longitudinally-spaced from the upstream side, of the respective slit.

The un-slit reinforcement tie and the one or more additional un-slit reinforcement ties may separate a respective slit into opposed transversely-spaced apart slit portions of the same length extending in the transverse direction.

The un-slit reinforcement tie and the one or more additional un-slit reinforcement ties may split a respective slit into transversely-spaced apart slit portions of at least two different lengths extending in the transverse direction.

At least one of the un-slit reinforcement tie or one of the one or more additional un-slit reinforcement ties may be of a different length extending in the transverse direction than the others of the un-slit reinforcement tie and the one or more additional un-slit reinforcement ties.

At least one slit of the plurality of expandable slits may have therein one additional un-slit reinforcement tie fully extending between an upstream side and a downstream side longitudinally-spaced from the upstream side of the respective slit, where the at least one slit extends in the transverse direction between opposed slit endpoints, and where spacing between each of the un-slit reinforcement tie and the additional un-slit reinforcement tie and a respective opposing slit endpoint is less than the spacing between the un-slit reinforcement tie and the additional un-slit reinforcement tie.

Each longitudinally-spaced row of slits may be transversely offset from the adjacent upstream longitudinally-spaced row of slits and the adjacent downstream longitudinally-spaced row of slits.

The expandable slit-sheet stock material may be configured to expand longitudinally, transversely, and in thickness such that the resultant expanded product has a reduced density as compared to the unexpanded expandable slit-sheet stock material.

The un-slit reinforcement tie of each slit may be configured to break into opposed longitudinally-separated broken portions during expansion of the respective slit also in the longitudinal direction.

The slit-sheet stock material may include paper.

The expandable slit-sheet stock material may be recyclable, biodegradable, and composed of a renewable resource.

The slit-sheet stock material may be wound to form a roll.

An exemplary method of making an expanded dunnage product from an expandable slit-sheet stock material includes the steps of (a) providing the aforementioned slit-sheet stock material wound to form a supply roll or fan-folded into a supply stack, (b) drawing sheet stock material from the supply, (c) breaking the reinforcement ties, and (d) opening the slits, where the opening and breaking steps include applying a force to the sheet stock material in a longitudinal direction transverse the slits.

The breaking and opening steps may occur concurrently for each row of slits.

An exemplary assembly for converting a slit-sheet stock material into an expanded dunnage product may include the slit-sheet stock material, means for drawing the slit-sheet stock material from the supply, means for breaking the reinforcement ties, and means for opening the slits.

The breaking means and the opening means may include a common pair of opposed rollers.

Each of the rollers of the common pair of opposed rollers may include a plurality of contact portions for engaging the slit-sheet stock material, where the contact portions are spaced apart along a longitudinal axis of each of the respective rollers, and where the contact portions extend radially further from the respective longitudinal axes than intermediate portions spaced therebetween.

An exemplary dunnage conversion system for expanding the improved slit-sheet stock material includes a supply of the improved slit-sheet stock material and a dunnage converter. The improved slit-sheet stock material includes a plurality of slits transversely spaced-apart by un-slit spacing portions. The un-slit spacing portions are provided for support and are not provided for being broken. The stock material also includes one or more un-slit reinforcement portions disposed intermediately in each slit of the plurality of slits. The un-slit reinforcement portions are smaller in the transverse direction of the slits than the un-slit spacing portions and are provided for restricting complete opening of the plurality of slits until being broken. The dunnage converter, also referred to as a dunnage conversion machine, has a pair of opposed rollers. The opposed rollers may include contact portions spaced apart from one another for engaging the stock material to effect breaking of the un-slit reinforcement portions and expansion of the slit-sheet stock material while minimizing or preventing tearing of the stock material.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

BRIEF DESCRIPTION OF THE DRAWINGS

The annexed drawings, which are not necessarily to scale, show various aspects of the disclosure.

DETAILED DESCRIPTION

The present invention provides an improved expandable slit-sheet stock material that is configured to aid in temporarily restricting opening of a plurality of slits of the slit-sheet stock material, such as during production of the unexpanded stock material or during expansion of the stock material. The improved slit-sheet stock material may improve yield and performance with respect to the production or the expansion of the stock material. The improved performance may include one or both of minimal jamming and minimal tearing of the stock material during the production or expansion.

Figure 1:
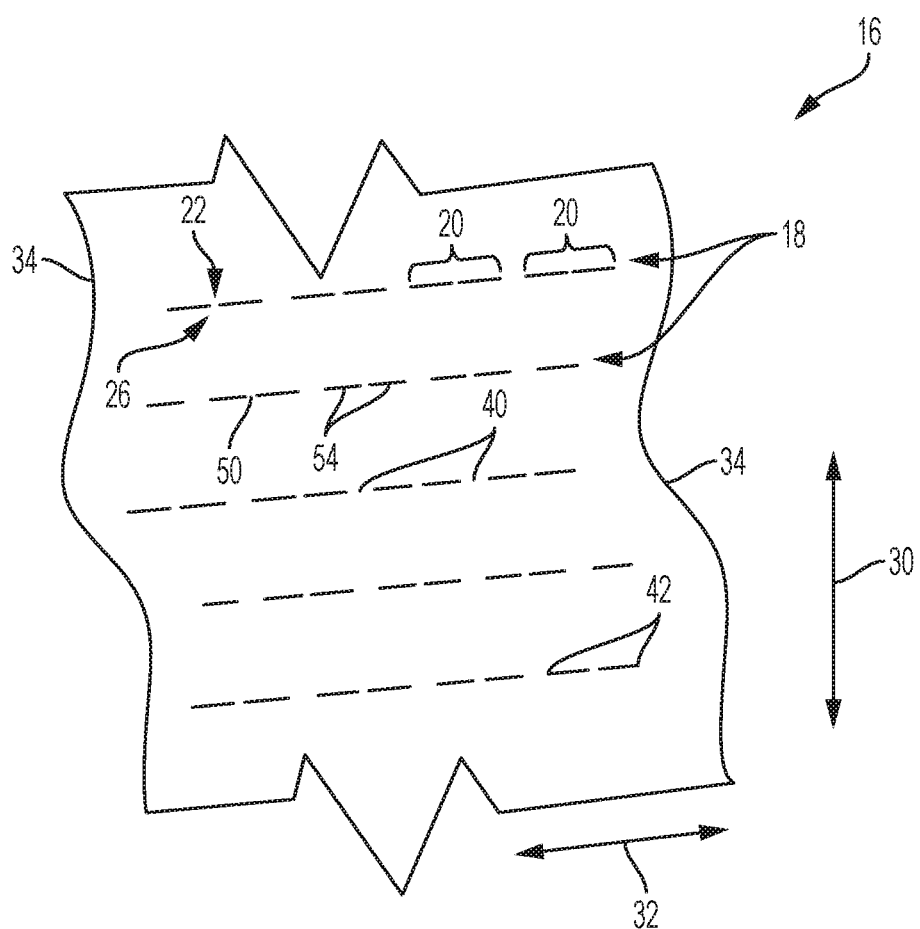
FIG. 1 is a partial view of a slit-sheet stock material in accordance with the present invention.
Figure 2A:
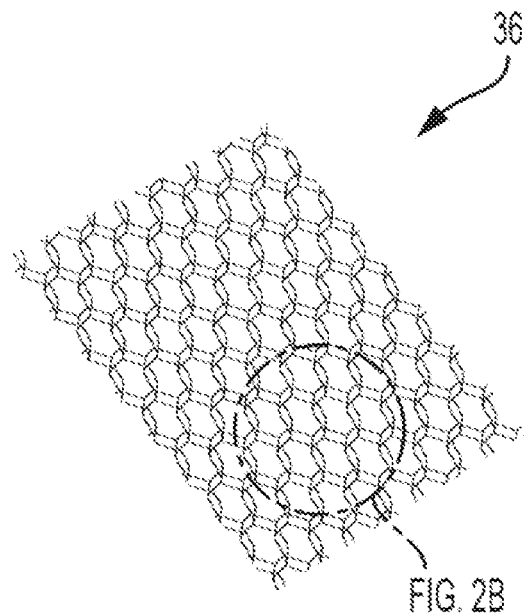
FIG. 2 is a partial view of an expanded dunnage product formed from the slit-sheet stock material of FIG. 1.
Figure 2B:
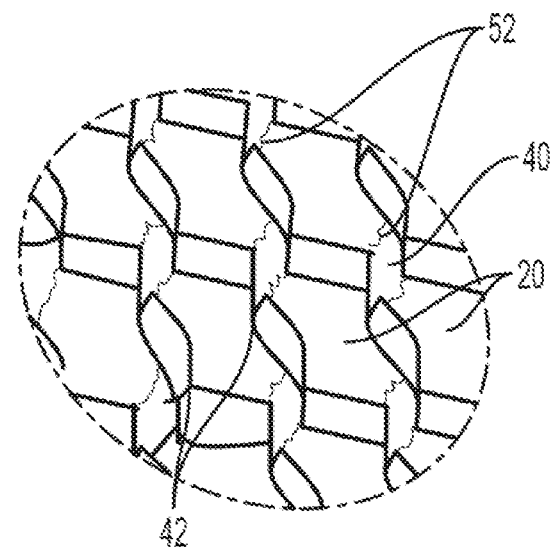

Referring now to FIGS. 1 and 2 in detail, an exemplary slit-sheet stock material is depicted at 16. The slit-sheet stock material 16, also herein referred to as the sheet material 16 for purposes of brevity, may include paper, such as kraft paper, and typically includes a single-ply kraft paper. A suitable kraft paper may have various basis weights, such as twenty-pound or forty-pound, for example. Paper is recyclable, biodegradable, and composed of a renewable resource. In some embodiments, the sheet material 16 may be laminated or may include any other suitable material such as another paper, plastic sheets, metal foil, or any combination thereof. In some embodiments the sheet material 16 may not include paper.

The sheet material 16 may be provided in a supply of sheet material 16 that typically includes one or more plies. The sheet material 16 generally is supplied in one or more rolls for use in a respective dunnage conversion system. In other embodiments, the sheet material 16 may be additionally or alternatively provided in another suitable arrangement, such as in a fan-folded stack, where the material is alternatingly folded into a stack of generally rectangular pages.

The slit-sheet material 16 generally has a plurality of longitudinally-spaced apart, transversely-extending rows 18 of slits 20 cut into the sheet material 16. The exemplary sheet material 16 with its plurality of slits 20 is configured to expand along a longitudinal feed direction 30, which is also the downstream direction, as it travels through a dunnage conversion system. The slits 20 may be formed by cutting, such as by stamping or die-cutting, the sheet material 16, or otherwise by weakening the sheet material intermittently across the sheet material 16. In this way the sheet material 16 separates across a majority, and preferably each, slit 20 under longitudinal tension provided in the longitudinally-directed upstream-to-downstream feed direction 30.

The exemplary sheet material 16 has a flat, planar shape with minimal thickness much less than either its width or length. The sheet material 16 is configured for expanding in one or more dimensions, also herein referred to as volume expansion or volumetric expansion. When a force is applied to the sheet material 16 in a direction transverse the direction of the slits 20, typically in the longitudinal feed direction 30, perpendicular to a width dimension of the sheet material 16, the sheet material 16 stretches in length. When sufficient force is applied, the sheet material adjacent an upstream side 22 of a slit 20 separates from the sheet material adjacent a downstream side 26 of the slit 20. The downstream side 26 is longitudinally-spaced from the upstream side 22 in the longitudinal feed direction 30. Due to the separation of the sides 22 and 26, the material's longitudinal length and its thickness increase, while the material's transverse width dimension between lateral edges 34 of the sheet material 16 decreases.

The increased thickness as the sheet material 16 is stretched longitudinally is caused at least in part via un-slit spacing portions 40 of the sheet material 16 between the rows 18 of slits 20 rotating relative to the plane of the unexpanded sheet material 16 as the upstream sides 22 and downstream sides 26 of the slits 20 separate. The thickness dimension extends in a normal direction relative to a face of the sheet material 16, and is a function of a longitudinal distance between slits 20 in adjacent transverse rows 18. The normal direction is defined as generally orthogonal to the material's longitudinal length and also generally orthogonal to a transverse extent between the lateral edges 34 of the sheet material 16.

The thickness of the slit-sheet material 16 can increase by an order of magnitude, or more, relative to its original thickness, when stretched in this manner. The expanded slit-sheet material 16 has an increased length and thickness and reduced width as compared to the unexpanded slit-sheet material 16. This longitudinal stretching and increase in thickness, results in a volumetrically expanded dunnage product 36 (FIG. 2). The increased volume allows the expanded dunnage product 36 to serve as a perforate protective void-fill or cushioning wrap for packaging articles in containers.

Referring now in greater detail to the slits 20 of the sheet material 16, in the illustrated embodiment of FIG. 1, the slits 20 extend in a transverse direction 32 across the width of the sheet material 16 between the lateral edges 34. The transverse direction 32 is transverse the longitudinal feed direction 30 of the material 16 through a related dunnage conversion system. Typically, the slits 20 are provided in the rows 18, such as longitudinally-spaced transverse rows 18. The rows 18 generally are parallel to one another and generally are periodically, and typically equally, spaced from one another. In other embodiments the rows 18 may be otherwise suitably arranged relative to one another.

The slits 20 are intermittently dispersed across the rows 18 with the slits 20 of each row 18 generally being staggered, such as being offset, in relation to slits 20 of directly adjacent upstream and downstream rows 18. The slits 20 are transversely-separated from one another by the un-slit spacing portions 40. Across each row 18 of slits 20, there may be a combined greater length of slits 20 than a length of the un-slit spacing portions 40 transversely-spaced between opposed slit endpoints 42 of the slits 20, providing for an optimum amount of expansion of the sheet material 16.

Each slit 20 extends in the transverse direction 32 between its slit endpoints 42 which are disposed between the lateral edges 34. Each slit 20 has intermediately therein an un-slit reinforcement tie 50 extending fully between and connecting the upstream side 22 to the downstream side 26 of the slit 20. The un-slit reinforcement tie 50 is disposed between the transverse endpoints 42 of the slit 20, preferably to separate the respective slit 20 into opposed transversely-spaced apart portions 54. As depicted, the transversely-spaced apart portions 54 may be of equal transverse length. The un-slit reinforcement tie 50 has a lesser length in the transverse direction 32 than either of the opposed transversely-spaced apart portions 54. The un-slit reinforcement ties 50 also are smaller in the transverse direction 32 than the un-slit spacing portions 40 transversely-disposed between adjacent slits 20 in a row 18.

Under sufficient tension provided in the longitudinal feed direction 30, the un-slit reinforcement tie 50 is configured to break into opposed longitudinally-separated broken slit portions 52 (FIG. 2) due to its minimal thickness in the transverse direction as compared to slit length or a length of an un-slit portion in the transverse direction. When the reinforcement ties 50 are broken, the laterally-adjacent slit portions 54 are opened to one another.

Via the dimensions and the location of the un-slit reinforcement ties 50 between the pairs of slit endpoints 42, the un-slit reinforcement ties 50 are configured to temporarily restrict opening of the respective slits 20. One instance where the temporary restricted opening is useful is during production of unexpanded sheet material 16. Particularly, after the slits 20 are formed in the base stock material, the newly-slit unexpanded stock material 16 is drawn into its final state before use with a respective dunnage conversion system. As previously mentioned, the final state may be a fan-folded stack or a wound roll of expandable slit-sheet stock material 16, though other configurations may be suitable.

During the temporary winding or folding process for each respective section, for example, it is less than desirable for the slits 20 to open, even partially. The un-slit reinforcement ties 50 are formed intermediately in the slits 20 to temporarily resist tension urging the upstream and downstream sides 22 and 26 of the slits 20 to separate from one another. The un-slit reinforcement ties 50 extend in the longitudinal feed direction 30 and thus provide strength in this same direction along which the stock material 16 is drawn into its final state. In turn, opening of the slits 20 is minimized, and preferably prevented, and consequently, bunching, tearing, or jamming of the sheet material 16 also is minimized, and preferably prevented. For example, tearing of the sheet material 16 in the transverse direction 32 at the transverse endpoints 42 into the un-slit spacing portions 40 is minimized. It follows that efficiency is improved in the winding or the fan-folding of the newly-slit unexpanded stock material 16 until the stock material 16 is in the form of a fan-folded stack or a wound roll, for example.

The un-slit reinforcement ties 50 likewise are configured to resist tension in the longitudinal feed direction 30 at least temporarily during expansion of the slit-sheet stock material 16 in a respective dunnage conversion system. Thereafter, the un-slit reinforcement ties 50 are configured to break to allow full opening of the slits 20. Due to the initial restriction of opening of the slits 20 by the reinforcement ties 50, and then the breaking of the reinforcement ties 50, the slit-sheet stock material 16 is restricted, if not prevented, from tearing, binding, and jamming during expansion.

Particularly, as the sheet material 16 is drawn in the longitudinal feed direction 30 higher tension is applied to the slit-sheet stock material during the expansion process than was applied during the production process, and the slits 20 begin to open. As aforementioned, the upstream sides 22 of the slits 20 begin to separate from the downstream sides 26 of the slits 20. At this stage, each slit 20 is temporarily restricted from opening in the longitudinal feed direction 30 by the reinforcement tie 50 disposed therein, and which extend in the longitudinal direction 30.

By temporarily restricting the opening of the slits 20, the reinforcement ties 50 facilitate control of the expansion of the sheet material 16. For example, by maintaining some tension between the upstream and downstream sides 22, 26 of the slits 20, the reinforcement ties 50 prevent too rapid of an opening of the slits 20. Too rapid of opening could cause tearing of the sheet material 16 in the transverse direction 32 at the transverse endpoints 42 into the un-slit spacing portions 40.

Upon further drawing of a respective longitudinally-extending portion of the stock material 16 in the longitudinal feed direction 30 in the dunnage conversion system, the reinforcement ties 50 are caused to break into the longitudinally-separated broken slit portions 52. The slits 20 are then enabled to fully open, the laterally-adjacent slit portions 54 are opened to one another, and the un-slit spacing portions 40 transversely-disposed between slits 20 are enabled to rotate out of the plane of the sheet material 16. In this way, the sheet material 16 continues to volumetrically change due to the continued expansion.

The respective dunnage conversion system, discussed in greater detail below, may be configured to effect breaking of the reinforcement ties 50 at a particular location in the dunnage conversion system. This added control may minimize, or preferably prevent, complete expansion of the slits 20 until the respective slits 20 are further downstream in the dunnage conversion system, such as nearer at outlet of the dunnage conversion system, for example.

Figure 3:
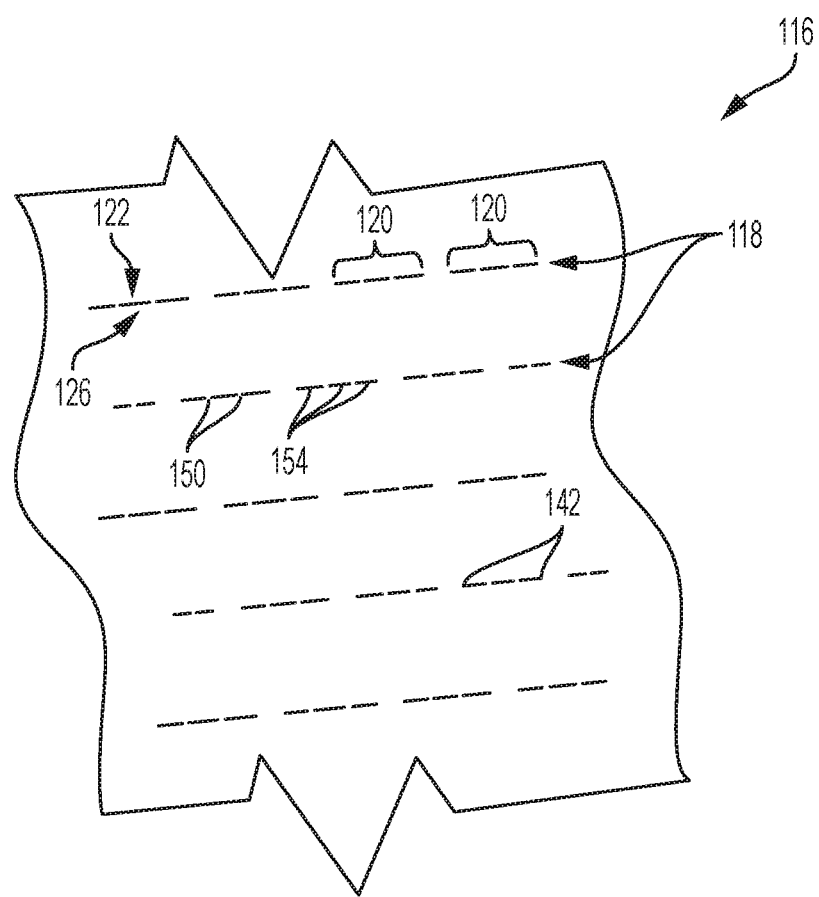
FIG. 3 is a partial view of another slit-sheet stock material in accordance with the present invention.

Referring next in brief to FIG. 3, another exemplary sheet material is shown at 116. The sheet material 116 is substantially the same as the above-referenced sheet material 16, and consequently corresponding reference numerals but indexed by 100 are used to denote structures corresponding to similar structures in the sheet material 116. In addition, the foregoing description of the sheet material 16 is equally applicable to the sheet material 116 except as noted below. Moreover, it will be appreciated upon reading and understanding the following description that aspects of the sheet material 16 and the sheet material 116 may be substituted for one another or used in conjunction with one another where applicable.

The sheet material 116 includes a plurality of longitudinally-spaced, transversely-extending rows 118 of slits 120 cut into the sheet material 116. Each slit 120 has therein two transversely-spaced apart un-slit reinforcement ties 150. The pair of un-slit reinforcement ties 150 is spaced between the opposed transverse endpoints 142 of the respective slit 120. Each reinforcement tie 150 extends fully between and connects an upstream side 122 of the respective slit 120 and a downstream side 126 of the respective slit 120. The reinforcement ties 150 separate each respective slit 120 into three transversely-spaced apart portions 154, which may be of equal transverse length. Upon breaking of the reinforcement ties 150 and opening of the respective slits 120, the three transversely-spaced apart portions 154 are opened to one another.

Provision of more than one reinforcement tie 150 in each slit 120 of the sheet material 116 may provide increased control of the opening of the slits 120. Thus, restriction of opening of the slits 120 may be temporarily restricted for a longer period of draw during a respective production process or through a respective dunnage conversion system than if the slits 120 included a single reinforcement tie 150. One instance where an increased resistance to opening of the slits 120 may be useful is where a sheet material 116 of a low basis weight is used. For example, a low basis weight material, such as a kraft paper of less than twenty-pound basis weight, may tear more easily than a high basis weight material, such as a kraft paper of a forty-pound basis weight.

Further embodiments of sheet materials may include any one or more of (i) slits of any suitable transverse length, (ii) transversely-spaced apart slit portions of any suitable transverse length, (iii) any suitable number of reinforcement ties, one or more, and (iv) reinforcement ties of any suitable transverse width.

Figure 4A:
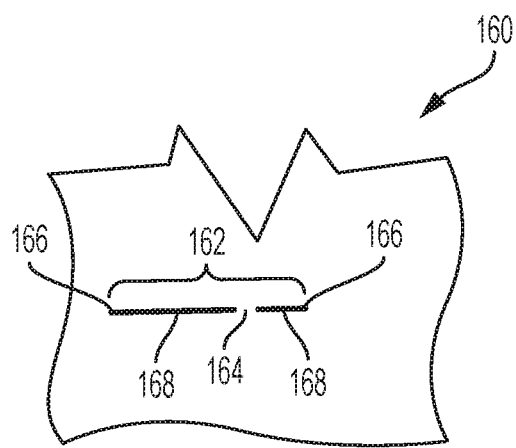
FIG. 4A is a partial view of yet another slit-sheet stock material in accordance with the present invention.
Figure 4B:
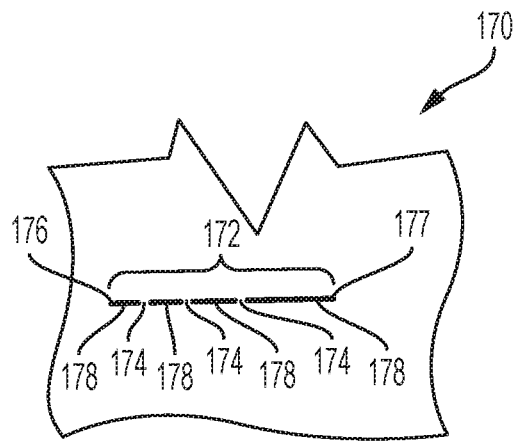
FIG. 4B is a partial view of still another slit-sheet stock material in accordance with the present invention.
Figure 4C:
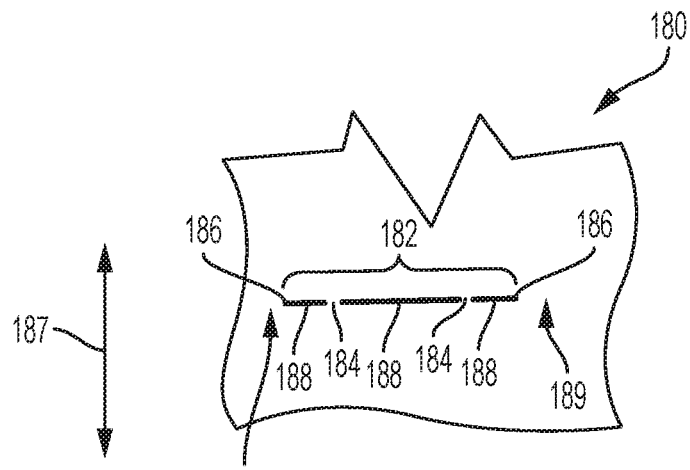
FIG. 4C is a partial view of another slit-sheet stock material in accordance with the present invention.

For instance, turning next to FIGS. 4A-4C, three different embodiments of expandable slit-sheet stock materials are partially illustrated including unbalanced slits, such as slits having transversely-spaced apart slit portions of different lengths. FIG. 4A illustrates a sheet material 160 having one or more slits 162 including a single reinforcement tie 164. The reinforcement tie 164 is positioned between transversely-opposed slit endpoints 166 such that the reinforcement tie 164 is offset from a midpoint between the endpoints 166. Thus, two transversely-spaced apart slit portions 168 of unequal length or formed. The leftmost slit portion 168 has a longer transverse length than the rightmost slit portion 168.

FIG. 4B illustrates a sheet material 170 having one or more slits 172 including three reinforcement ties 174. The reinforcement ties 174 are positioned equidistant from one another but are not transversely-spaced equally apart between slit endpoints 176 and 177. Rather the reinforcement ties 174 are each disposed nearer a left slit endpoint 176 than an opposed right slit endpoint 177. With this spacing, four transversely-spaced apart slit portions 178 are formed, where three of the slit portions 178 are of equal length and the rightmost slit portion 178 (nearest the right slit endpoint 177) has a larger length than the three other slit portions 178.

FIG. 4C illustrates a sheet material 180 having one or more slits 182 including two reinforcement ties 184. The reinforcement ties 184 are each positioned adjacent an opposed slit endpoint 186. Spacing between each of the un-slit reinforcement ties 184 and a respective opposing slit endpoint 186 is less than the spacing between the un-slit reinforcement ties 184. The two reinforcement ties 184 split the illustrated respective slit 182 into transversely-spaced apart slit portions 188 of at least two different lengths extending in the transverse direction. Particularly, three transversely-spaced apart slit portions 188 are formed, where the center slit portion 188 is longer than the two outer slit portions 188 of equal transverse length. Due to the placement of the two un-slit reinforcement ties 184, the illustrated slit 182 is configured with added strength at or near the slit endpoints 186 to minimize tearing transversely outwardly from the slit endpoints 186 when tension is applied in a longitudinal feed direction 187, such as during opening of the illustrated slit 182. The slit 182 is configured first to tear at the ties 184 when initially opening, rather than tearing into un-slit portions 189 adjacent the slit endpoints 186.

Figure 5A:
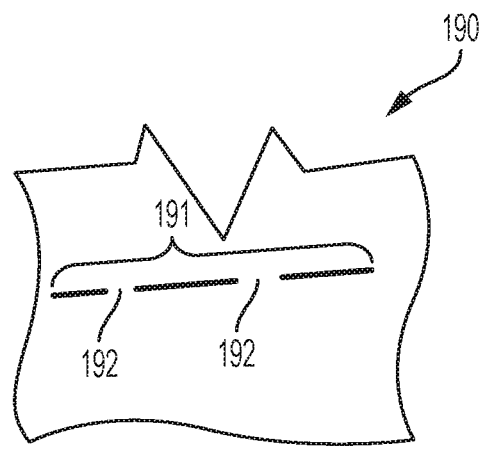
FIG. 5A is a partial view of yet another slit-sheet stock material in accordance with the present invention.
Figure 5B:
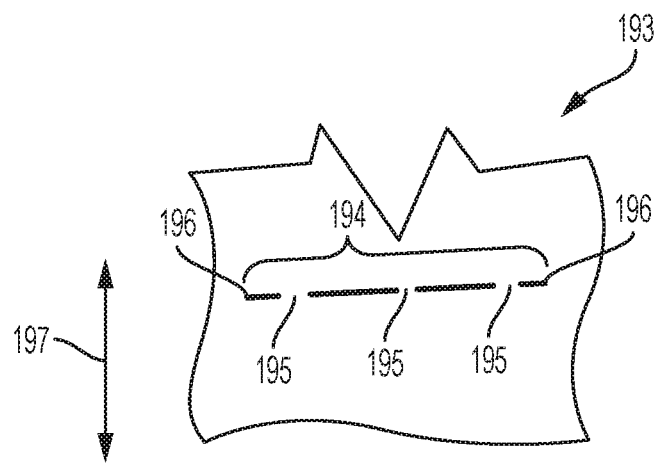
FIG. 5B is a partial view of still another slit-sheet stock material in accordance with the present invention.

Referring now to FIGS. 5A and 5B, two different embodiments of expandable slit-sheet stock materials are partially illustrated including slits having reinforcement ties of different transverse lengths, such as where at least one reinforcement tie is of a different transverse length than the other reinforcement tie(s). FIG. 5A depicts a sheet material 190 having one or more slits 191. The illustrated slit 191 includes two transversely-spaced apart reinforcement ties 192, where each tie 192 is of a different transverse length. FIG. 5B depicts a sheet material 193 including a slit 194 having three reinforcement ties 195. A center tie 195 is smaller in transverse length than two outer ties 195 of equal transverse length. During expansion, the center tie 195 will break prior to breaking of the two outer ties 195. Similar to the embodiment of FIG. 4C, due to the placement of the two outer un-slit reinforcement ties 195, the illustrated slit 194 is configured with added strength at or near the slit endpoints 196 to minimize tearing transversely outwardly from the slit endpoints 196 when tension is applied in a longitudinal feed direction 197, such as during opening of the illustrated slit 194.

Figure 6:
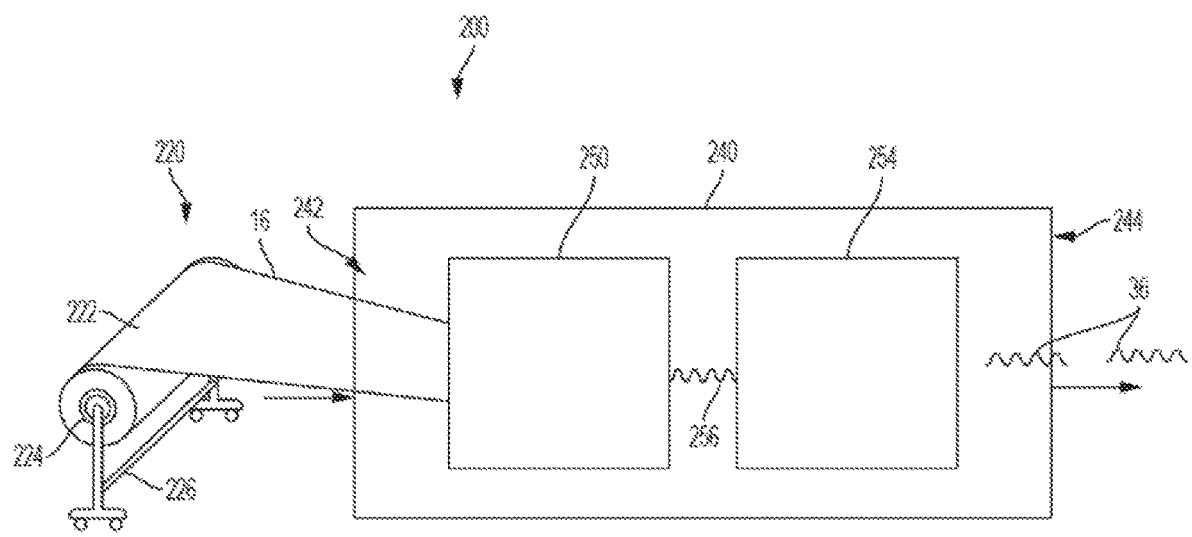
FIG. 6 is a schematic view of an exemplary dunnage conversion system provided in accordance with the present invention including both a dunnage conversion machine and one or more supplies of the slit-sheet stock material of FIG. 1.

Turning now to FIG. 6, the present invention further provides a dunnage conversion system 200 for expanding a slit-sheet stock material such as the aforementioned sheet materials 16, 116, 160, 170, 180, 190, and 193. A dunnage conversion system 200 is schematically shown, though description of the conversion system 200 will be with reference to the sheet material 16 including slits 20 each having a single reinforcement tie 50 disposed intermediately therein.

The dunnage conversion system 200 includes a supply 220 of the slit-sheet stock material 16 and a dunnage conversion machine 240. As shown, the sheet material 16 is in the form of a roll 222 wound about a hollow core 224 that may be received on a respective supply support 226. An exemplary supply support may have an axle (not shown) that rotates with the hollow core 224 or about which the hollow core 224 rotates as the sheet material 16 is unwound off the roll 222.

Generally, the dunnage conversion machine 240, also herein referred to as the conversion machine 240 or converter 240, includes a means for drawing the slit-sheet stock material 16 from the supply 220, a means for breaking the reinforcement ties 50, and a means for opening the slits 20. Any two or more of the means may be concurrently provided by a single subassembly, such as simultaneously provided. As used herein, concurrent events can occur intermittently relative to one another (which may or may not include overlap of the respective events) or overlap continuously over a given period of time, where simultaneous events overlap continuously over a given period of time.

As schematically depicted, the conversion machine 240 receives the sheet material 16 from the supply 220. The sheet material 16 advances in a downstream direction from an inlet 242 of the conversion machine 240 to an outlet 244 of the conversion machine 240. The conversion machine 240 includes at least an expander 250, but optionally may also include a separator 254 downstream from the expander 250 for separating discrete dunnage products 36 from a continuous expanded dunnage strip 256 output from the expander 250. The expander 250 is located downstream of the supply 220 and upstream of the optional separator 254.

Figure 7:
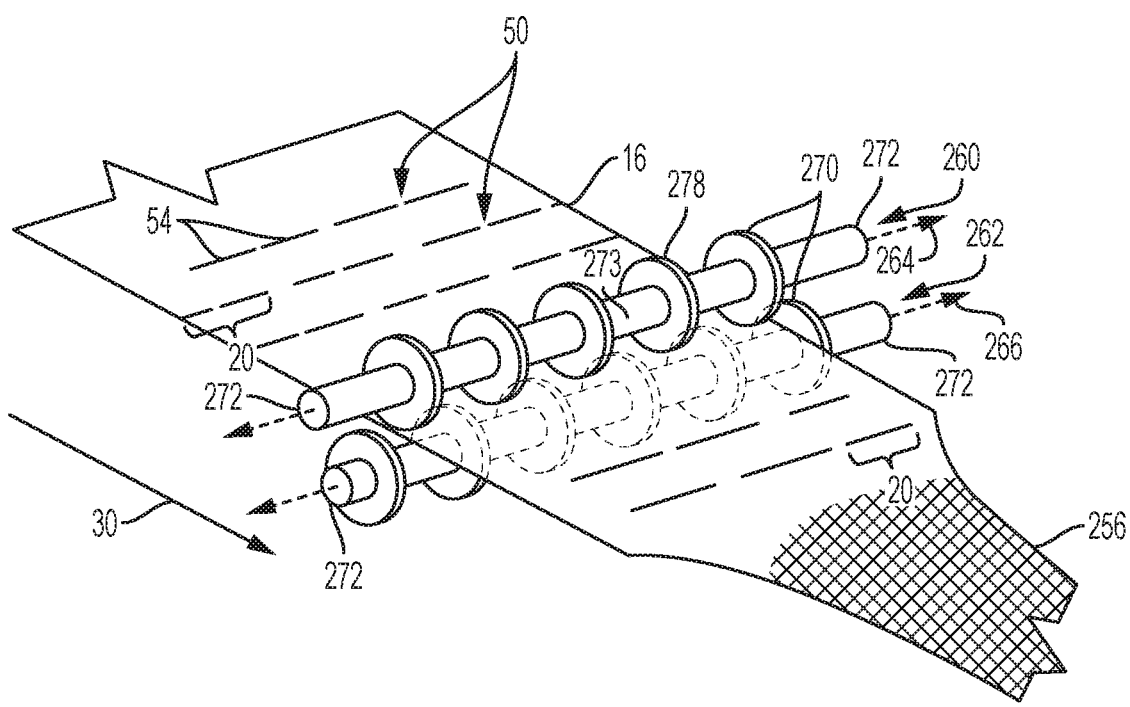
FIG. 7 is a partial schematic view of the conversion machine of FIG. 6.

Referring next to FIG. 7, a partial view of the expander 250 is shown. The expander 250 includes a frame (not shown) supporting opposed rollers 260 and 262. As depicted, the opposed rollers 260 and 262 are configured as both an opening means for opening the slits 20 and a breaking means for breaking the reinforcement ties 50. The opposed rollers 260 and 262, such as the depicted opposed breaking members 260 and 262, are configured for breaking the un-slit reinforcement ties 50 during expansion of the plurality of slits 20.

The pair of opposed breaking members 260 and 262 is rotatable about respective parallel axes 264 and 266. The opposed breaking members 260 and 262 may rotate in the same or in opposite directions relative to one another about the respective axes 264 and 266. The opposed breaking members 260 and 262 are spaced apart in the normal direction for gripping the sheet material 16 received from the supply 220 therebetween. The opposed breaking members 260 and 262 are each segmented and each include a plurality of contact portions 270 transversely-spaced apart from one another between respective opposed transverse ends 272 of the breaking members 260 and 262. The segmenting of the breaking members 260 and 262 may assist in facilitating increased rotation of portions of the sheet material 16 out of the original plane of the sheet material 16 during its expansion.

The contact portions 270 extend further radially outward from the axes 264 and 266 than intermediate portions 273 disposed therebetween. For example, the illustrated contact portions 270 are each disc-shaped portions having a gripping surface 278 at a circumferential extent of the contact portions 270, which is provided to engage the sheet material 16. The gripping surface 278 may any suitable gripping means such as radially-outwardly extending projections or other friction-providing surface, such as and including a rubber.

In some embodiments, the axle of the supply 220 may be rotatably tensioned. This may provide tension on the unexpanded sheet material 16 being drawn between the supply 220 and the expander 250, resulting in the aforementioned concurrent breaking and expansion.

In some embodiments, the expander 250 may include one or more separate driven feeding members rotatably coupled to the frame for advancing the sheet material 16 through the conversion system 200. These feeding members may be disposed downstream of the rollers 260 and 262, for example. By setting a gripping force of the rollers 260 and 262 on the sheet material 16 relative to a gripping force of the feeding members on the sheet material 16, the slits 20 may be expanded during advancement between the rollers 260 and 262 and the feeding members.

In some embodiments one or both of the breaking members 260 and 262 may be driven. In other embodiments, a pulling force at the outlet 244 of the conversion machine 240 may be provided by an additional assembly or may be a user-provided force.

In some embodiments, one or both of the breaking members 260 and 262 may be biased towards the other of the breaking members 260 and 262 to account for variance in sheet material thickness or use of sheet materials of different thicknesses. An adjustment member may be included for adjusting a biasing force of a biasing member.

Turning now to the optional separator 254 illustrated in FIG. 6, the continuous dunnage strip 256 may be separated or severed to provide distinct dunnage products 36 of a desired length. The separator 254 may include one or more cutting members, which may be actuated manually or automatically. An exemplary severing assembly is described in U.S. Pat. No. 4,699,609 to Ranpak Corp. of Concord Township, Ohio.

In some situations, the separator 254 may be omitted altogether, such as where discrete lengths of sheet material are supplied to the expander 250. Another alternative is to employ a sheet stock material that is perforated across its width so that a length of dunnage product can be torn from the dunnage strip 256. The perforations can be formed in the stock material before being supplied to the expander 250 or formed as part of the conversion process. Additionally or alternatively, the expander 250 may be configured to automatically separate a desired length of dunnage product from dunnage strip made of perforated stock material. This can be accomplished by providing a second set of rotating members upstream or downstream of the opposed rollers 260 and 262, and stopping whichever set is upstream, while continuing to feed sheet material through the downstream set of rotating members.

In view of the above, the present invention also provides a method for expanding the slit-sheet stock material 16, 116, 160, 170, 180, 190, 193 wound to form a supply 220 in the form of a roll or a fan-folded stack. The method includes the steps of (a) drawing the sheet material 16, 116 from the supply 220, (b) breaking the un-slit reinforcement ties 50, 150, and (c) opening the slits 20, 120. The opening and breaking steps (b) and (c) include applying a force to the sheet material 16, 116 in a longitudinal direction transverse the slits 20, 120. In some embodiments, the breaking and opening steps (b) and (c) may occur concurrently, such as simultaneously, for each row 18, 118 of slits 20, 120.

Figure 8:
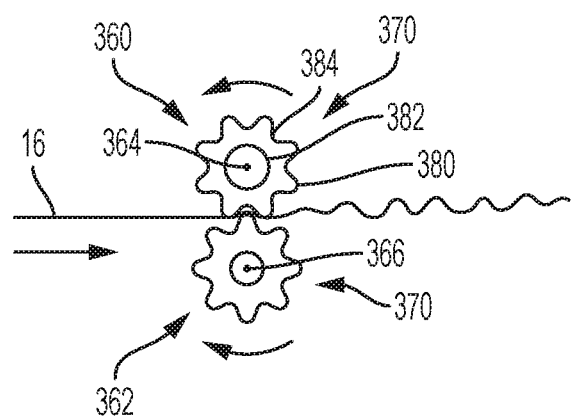
FIG. 8 is a cross-sectional view through the breaking members of another conversion machine in accordance with the invention.

Turning next to the alternative embodiment of FIG. 8, each transversely-spaced apart contact portion 370 may be a toothed-gear 370. The toothed-gears 370 may be spaced apart from one another in the normal direction such that the teeth 380 may apply friction to or even tear or break through the reinforcement ties of the sheet material 16, 116, 160, 170, 180, 190, 193. The opposed breaking members 360 and 362 may rotate in the same or in opposite directions relative to one another about the respective axes 364 and 366.

Each toothed-gear 370 may include a plurality of circumferentially spaced-apart teeth 380 extending from a gear center 382. The spaced-apart teeth 380 define spaces 384 therebetween, with the gears 370 being rotatable about the respective axes 364 and 366. The toothed-gears 370 of the first breaking member 360 may be rotatably positioned relative to the toothed-gears 370 of the second breaking member 362 so that the plurality of teeth 380 of the toothed-gears 370 of the first breaking member 360 interlace sequentially with the plurality of teeth 380 of the toothed-gears 370 of the second breaking member 362 as the breaking members 360 and 362 rotate.

In some embodiments, the breaking members 360 and 362 may not include a plurality of discrete toothed-gears 370. Instead teeth 380 may extend along a transverse length of one or both breaking members 360 and 362 to form a single contact portion 370.

Figure 9:
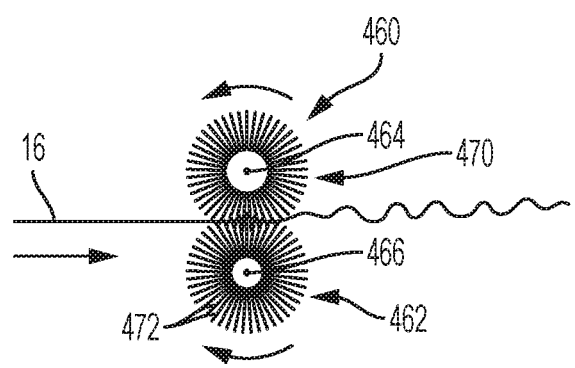
FIG. 9 is a cross-sectional view through breaking members of another conversion machine in accordance with the invention.

Turning finally to the additional alternative embodiment of FIG. 9, each transversely-spaced apart contact portion 470 may be a brush 470 having bristles 472 extending at least partially-circumferentially about, but preferably fully-circumferentially about, the respective axes 464 and 466 of the opposed breaking members 460 and 462. The contact portions may be spaced apart from one another in the normal direction such that the bristles 472 may apply friction to or even tear or puncture through the reinforcement ties of the sheet material 16, 116, 160, 170, 180, 190, 193. The bristles 472 may be made of any one or more suitable materials such as a polymer or metal. The opposed breaking members 460 and 462 may rotate in the same or in opposite directions relative to one another about the respective axes 464 and 466.

In some embodiments, the breaking members 460 and 462 may not include a plurality of discrete contact portions 470, and the bristles 472 may instead extend along a transverse length of one or both breaking members 460 and 462 to form a single contact portion 470.

In summary, an improved expandable slit-sheet stock material 16, 116, 160, 170, 180, 190, 193 is configured to aid in temporarily restricting opening of a plurality of slits 20, 120, 162, 172, 182, 191, 194 of the slit-sheet stock material 16, 116, 160, 170, 180, 190, 193, such as during winding of the unexpanded stock material 16, 116, 160, 170, 180, 190, 193 or during expansion of the stock material 16, 116, 160, 170, 180, 190, 193. Each slit 20, 120, 162, 172, 182, 191, 194 of the plurality of slits 20, 120, 162, 172, 182, 191, 194 includes one or more un-slit reinforcement portions 50, 150, 164, 174, 184, 192, 195, such as reinforcement ties, extending fully between opposite longitudinal sides of the slit 20, 120, 162, 172, 182, 191, 194, and disposed between opposed transverse slit endpoints 42, 142, 166, 176, 186, 196. The reinforcement ties 50, 150, 164, 174, 184, 192, 195 minimize or prevent tearing of the stock material 16, 116, 160, 170, 180, 190, 193 during the winding or expansion. A dunnage conversion system 200 for expanding the slit-sheet stock material 16, 116, 160, 170, 180, 190, 193 includes an expander 250 having a pair of opposed rollers 260, 262, 360, 362, 460, 462. The rollers 260, 262, 360, 362, 460, 462 engage the slit-sheet stock material 16, 116, 160, 170, 180, 190, 193 to effect breaking of the un-slit reinforcement portions 50, 150, 164, 174, 184, 192, 195 and expansion of the slit-sheet stock material 16, 116, 160, 170, 180, 190, 193.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

The invention claimed is:

1. A volumetrically expandable slit-sheet stock material for conversion into an expanded dunnage product via a dunnage converter, the slit-sheet stock material, comprising:
a plurality of expandable slits arranged in a plurality of transversely-extending, longitudinally-spaced rows of slits, wherein each slit is longitudinally expandable and has therein at least one un-slit reinforcement tie extending from an upstream side to a downstream side, the downstream side being longitudinally-spaced from the upstream side of the respective slit, each un-slit reinforcement tie separating a respective slit into transversely-spaced apart slit-portions and being smaller in the transverse direction than an un-slit spacing portion between adjacent slits in a row, wherein the at least one un-slit reinforcement tie temporarily restricts opening of the plurality of slits, and
wherein, upon volumetric expansion during conversion, the at least one un-slit reinforcement tie resists longitudinal tension before breaking into longitudinally-separated portions and placement of at least one un-slit reinforcement tie adds strength to minimize or prevent tearing of the un-slit spacing portions adjacent slit endpoints.

2. The volumetrically expandable slit-sheet stock material of claim 1, wherein the slits in each longitudinally spaced row of slits are transversely offset from the slits in an adjacent upstream longitudinally-spaced row of slits and the slits in an adjacent downstream longitudinally-spaced row of slits.

3. The volumetrically expandable slit-sheet stock material of claim 1, wherein the transversely spaced apart slit-portions are of equal length extending in the transverse direction, or are of different lengths extending in the transverse direction.

4. The volumetrically expandable slit-sheet stock material of claim 1, wherein the at least one reinforcement tie is a single reinforcement tie separating the respective slit into two transversely-spaced apart slit-portions of equal length extending in the transverse direction or two transversely-spaced apart slit-portions of unequal length extending in the transverse direction.

5. The volumetrically expandable slit-sheet stock material of claim 1, wherein the at least one un-slit reinforcement tie is a plurality of un-slit reinforcement ties.

6. The volumetrically expandable slit-sheet stock material of claim 5, wherein the plurality of un-slit reinforcement ties separate a respective slit into transversely-spaced apart slit-portions of equal length extending in the transverse direction.

7. The volumetrically expandable slit-sheet stock material of claim 5, wherein the plurality of un-slit reinforcement ties separate a respective slit into transversely-spaced apart slit-portions of at least two different lengths extending in the transverse direction.

8. The volumetrically expandable slit-sheet stock material of claim 1, wherein the at least one reinforcement tie of at least one slit comprises first and second reinforcement ties between opposing slit endpoints, wherein transverse spacing between a respective slit endpoint and an adjacent respective un-slit reinforcement tie is less than the transverse spacing between the first and second reinforcement ties.

9. The volumetrically expandable slit-sheet stock material of claim 5, wherein the plurality of un-slit reinforcement ties are three un-slit reinforcement ties separating the respective slit into four transversely-spaced apart slit-portions of equal length extending in the transverse direction or four transversely-spaced apart slit-portions of at least two different lengths extending in the transverse direction.

10. The volumetrically expandable slit-sheet stock material of claim 9, wherein the four transversely-spaced apart slit-portions are of two different lengths extending in the transverse direction, a first length between a respective slit endpoint and an adjacent respective un-slit reinforcement tie being smaller than a second length between adjacent un-slit reinforcement ties.

11. The volumetrically expandable slit-sheet stock material of claim 5, wherein the plurality of un-slit reinforcement ties are of at least two different lengths extending in the transverse direction.

12. The volumetrically expandable slit-sheet stock material of claim 1, wherein the slit-sheet stock material is recyclable, biodegradable, and composed of a renewable resource.

13. The volumetrically expandable slit-sheet stock material of claim 12, wherein the slit-sheet stock material includes paper.

14. The volumetrically expandable slit-sheet stock material of claim 1, wherein the volumetric expansion is such that the resultant expanded dunnage product has a reduced density as compared to the unexpanded expandable slit-sheet stock material.

15. The volumetrically expandable slit-sheet stock material of claim 1, wherein the slit-sheet stock material is wound to form a supply roll or fan-folded into a supply stack.

16. A method of making the expanded dunnage product from the volumetrically expandable slit-sheet stock material of claim 1, comprising the steps of:
providing the slit-sheet stock material wound to form a supply roll or fan-folded into a supply stack;
drawing the sheet stock material from the supply roll or the supply stack;
breaking the reinforcement ties; and
opening the slits
wherein the opening and breaking steps include applying a force to the sheet stock material in a longitudinal direction across the slits.

17. The method of claim 16, wherein the breaking and opening steps occur concurrently for each row of slits.

18. A dunnage conversion assembly for converting the volumetrically expandable slit-sheet stock material into the expanded dunnage product, comprising:
the volumetrically expandable slit-sheet stock material of claim 1 wound to form a supply roll or fan-folded into a supply stack;
the dunnage converter comprising:
a means for drawing the slit-sheet stock material from the supply roll or the supply stack;

a means for breaking the reinforcement ties; and
a means for opening the slits.

19. The dunnage conversion assembly of claim 18, wherein the breaking means and the opening means include a pair of opposed rollers.

20. The dunnage conversion assembly of claim 18, wherein each of the rollers of the pair of opposed rollers includes a plurality of contact portions for engaging the slit-sheet stock material, wherein the contact portions are spaced apart along a longitudinal axis of each of the respective rollers, and wherein the contact portions extend radially further from a respective longitudinal axis than intermediate portions separating adjacent contact portions.

* * * * *